March 25, 1952   E. D. MEAD ET AL   2,590,263
ELECTRICAL CONTROL APPARATUS
Filed Feb. 13, 1945   7 Sheets-Sheet 1

INVENTORS E.D. MEAD
O.S.A. MESCH
BY J. MacDonald
ATTORNEY

March 25, 1952 E. D. MEAD ET AL 2,590,263
ELECTRICAL CONTROL APPARATUS
Filed Feb. 13, 1945 7 Sheets-Sheet 2
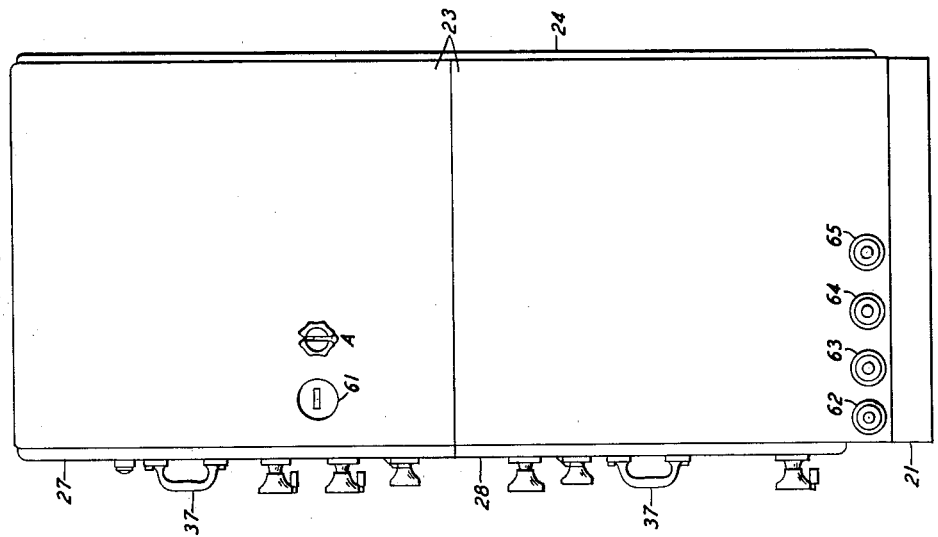
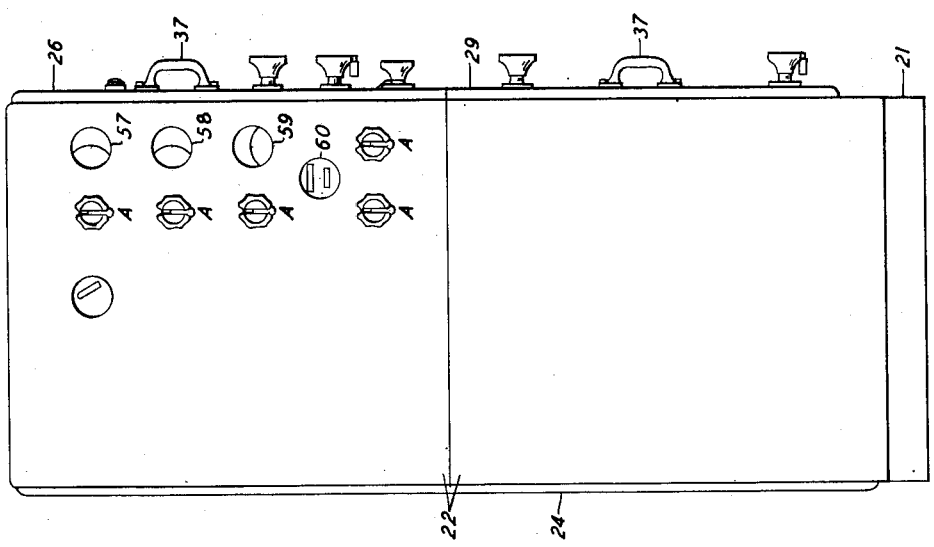
INVENTORS E.D. MEAD
O.S.A. MESCH
BY J. MacDonald
ATTORNEY March 25, 1952   E. D. MEAD ET AL   2,590,263
ELECTRICAL CONTROL APPARATUS
Filed Feb. 13, 1945   7 Sheets-Sheet 3

TYPE C

INVENTORS E. D. MEAD
O. S. A. MESCH
BY J. MacDonald
ATTORNEY

March 25, 1952  E. D. MEAD ET AL  2,590,263
ELECTRICAL CONTROL APPARATUS
Filed Feb. 13, 1945  7 Sheets-Sheet 4

TYPE A

INVENTORS E. D. MEAD
O. S. A. MESCH
BY
ATTORNEY

March 25, 1952

E. D. MEAD ET AL 2,590,263

ELECTRICAL CONTROL APPARATUS

Filed Feb. 13, 1945

TYPE A

TYPE B

INVENTORS E. D. MEAD
O. S. A. MESCH
BY J. MacDonald
ATTORNEY

March 25, 1952 E. D. MEAD ET AL 2,590,263
ELECTRICAL CONTROL APPARATUS
Filed Feb. 13, 1945 7 Sheets-Sheet 6

TYPE E

TYPE D

INVENTORS E.D.MEAD
O.S.A.MESCH
BY J. MacDonald
ATTORNEY

March 25, 1952 E. D. MEAD ET AL 2,590,263
ELECTRICAL CONTROL APPARATUS
Filed Feb. 13, 1945 7 Sheets-Sheet 7
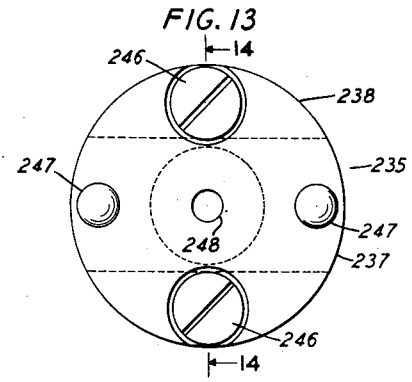
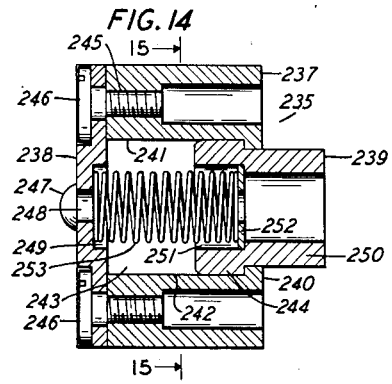
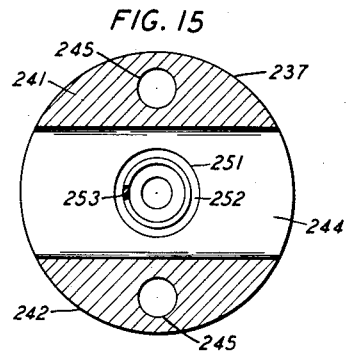
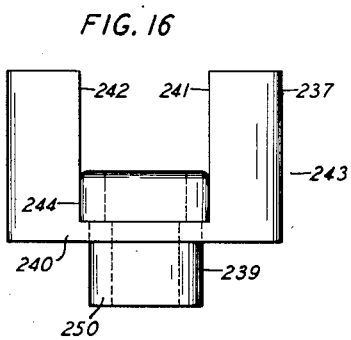
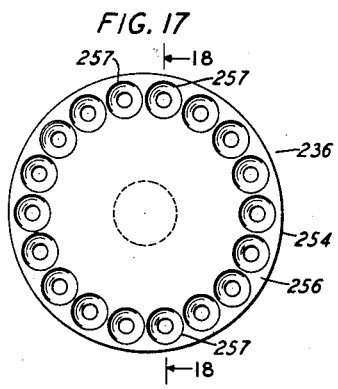
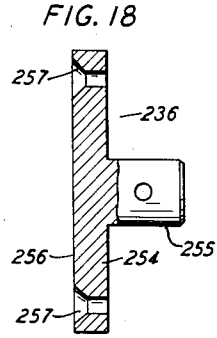
INVENTORS E.D.MEAD
O.S.A. MESCH
BY
J. MacDonald
ATTORNEY Patented Mar. 25, 1952

2,590,263

UNITED STATES PATENT OFFICE 2,590,263

ELECTRICAL CONTROL APPARATUS

Edward D. Mead, Caldwell, N. J., and Orwar S. A. Mesch, St. Albans, N. Y., assignors to Bell Telephone Laboratories Incorporated, New York, N. Y., a corporation of New York Application February 13, 1945, Serial No. 577,632

3 Claims. (Cl. 74—548)

This invention relates to electrical control apparatus and more particularly to electrical control apparatus comprising a removable control panel on which turnable control knobs are provided to facilitate operation of electrical devices in the control apparatus.

The object of the invention is to provide improved control panel and knob means for electrical control apparatus.

A feature of the invention resides in the control panel on which the control knobs are mounted.

Another feature resides in the control knobs in which means are provided to render the knobs effective to turn shafts and ineffective to turn the shafts.

Another feature resides in a mechanical brake means for the control knob.

Another feature resides in a coupling mounted on part of the control apparatus and engaging part of a control knob when the control panel is mounted in normal position.

In the drawings:

Figs. 2 and 3 are respectively a left side elevation and a right side elevation of the electrical control apparatus;

Figures 4, 5, 6:
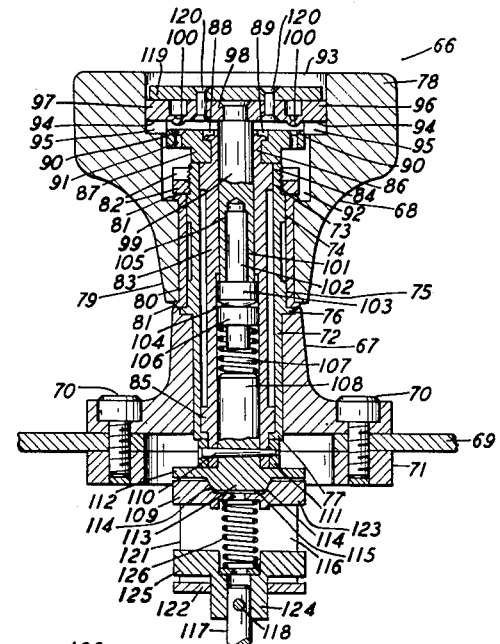
Fig. 4 is a view, in section, of one of the forms of control knobs in engagement with a coupling.
Figure 7:
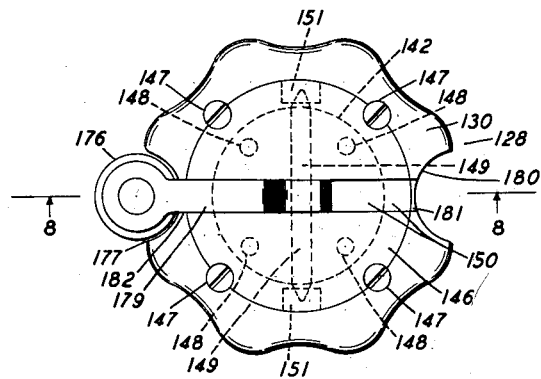
Figure 8:
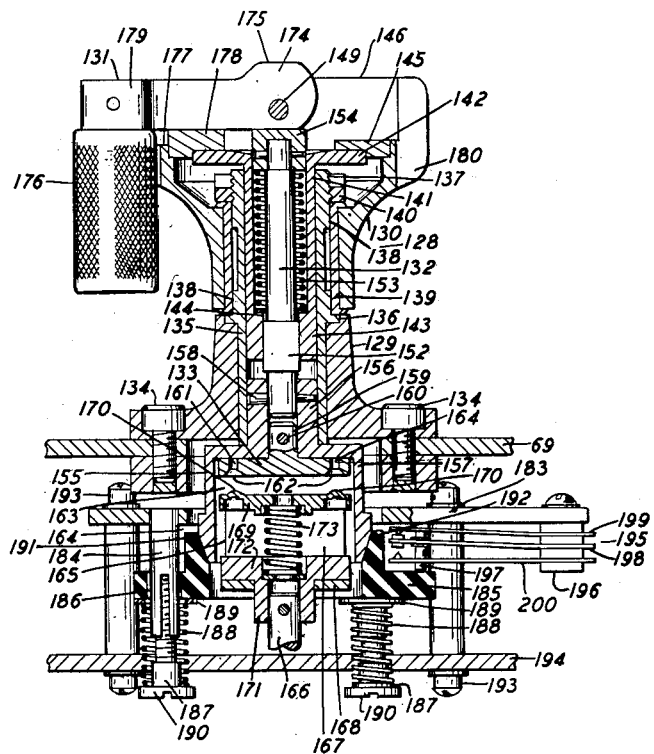
Figure 9:
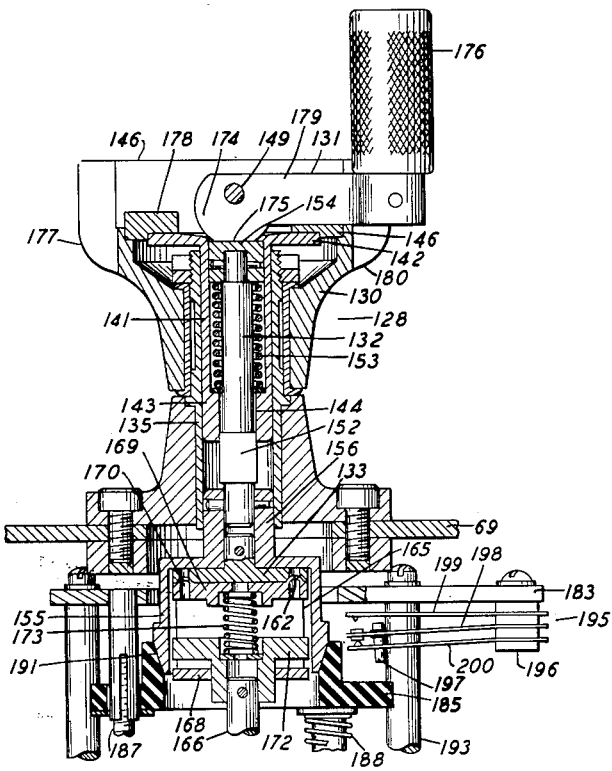
Figure 10:
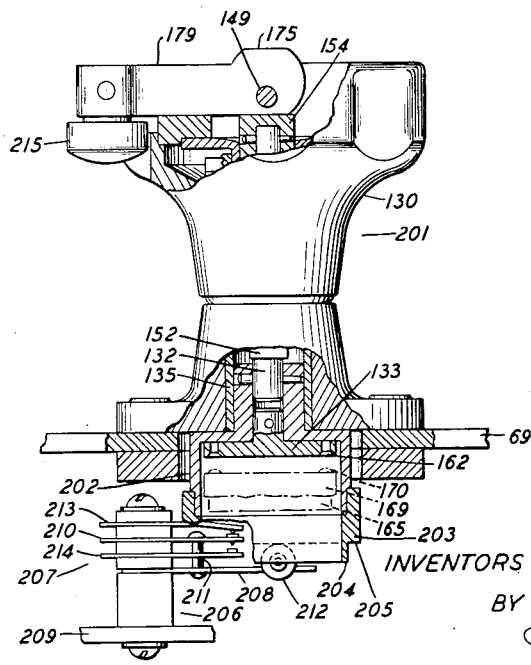
Figure 11:
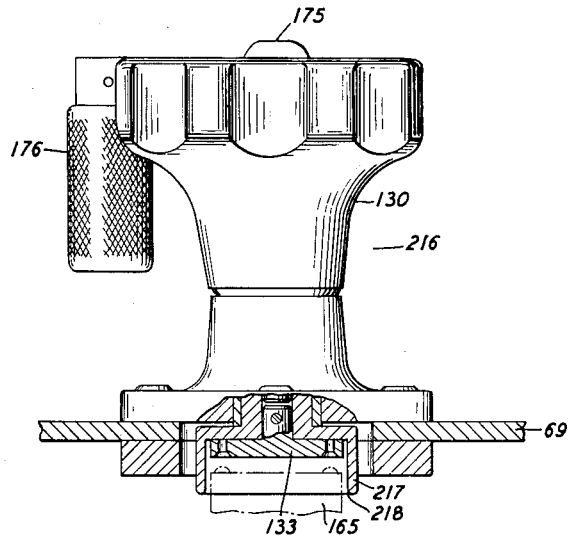
Figure 12:
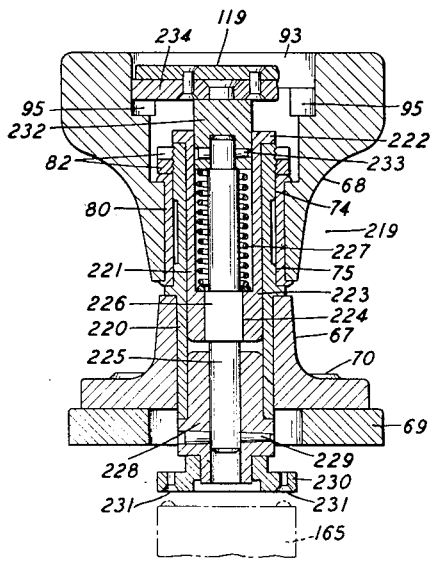

Fig. 5 corresponds to Fig. 4 but with parts of the control knob in condition to cooperate in turning the coupling;

Fig. 6 is a top view of the control knob shown in Figs. 4 and 5 and with part of the structure broken away to disclose other parts;

Fig. 7 is a top view of another form of control knob and in which a crank is provided to facilitate turning the knob;

Fig. 8 is a view, in vertical section, of the control knob shown in Fig. 7 and shows the brake and a switch controlled by means of the brake;

Fig. 9 corresponds to Fig. 8 but with the crank and brake moved to different positions;

Fig. 10 is a view, partly in section, of another form of control knob and provided with an electric switch means;

Fig. 11 is a view, partly in section, of another form of control knob;

Fig. 12 is a view, in section, of another form of control knob;

Fig. 13 is an end view of a coupling;

Fig. 14 is a side view, in section, of the coupling shown in Fig. 13;

Fig. 15 is a view of the coupling shown in Fig. 13 but with a clutch plate removed;

Fig. 16 is a side elevation of the coupling parts shown in Fig. 15 but turned 90 degrees relative to that figure;

Fig. 17 is a face view of a clutch disc to engage the clutch plate of the coupling parts shown in Figs. 13 and 14; and Fig. 18 is a side view, in section, of the clutch disc shown in Fig. 17.

Figure 1:
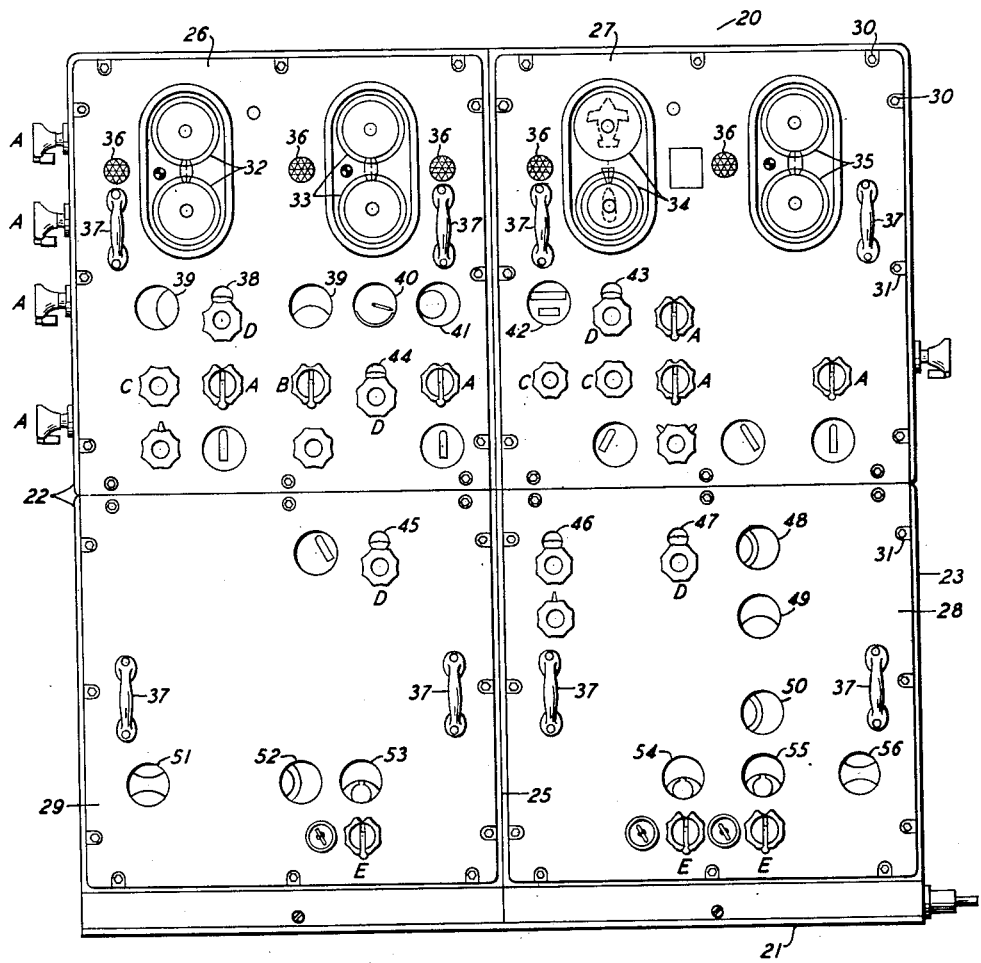
Fig. 1 is a front elevation of the electrical control apparatus.

The electrical control apparatus of this invention has been found useful in gun director apparatus and is illustrated in Figs. 1, 2 and 3 as included in a computer, the function of which is to determine how guns on a ship must be aimed so that a projectile or projectiles will reach a target.

The computer shown in Figs. 1, 2 and 3 comprises a casing 20 having a base 21, a left side wall 22, a right side wall 23, a back wall 24, a front frame 25 and removable control panels 26, 27, 28 and 29. The control panels 26, 27, 28 and 29 are removably mounted on the front of the casing 20 by means of bolts or other suitable fastening means 30 which extend through apertured recesses 31 in the control panels and into other portions of the casing 20. The control panels are equipped with handles 37 to facilitate handling the control panels when the control panels are being removed from or applied to the casing 20.

The control panels 26, 27, 28 and 29 are apertured at required points to accommodate parts of control members and so that dials and signal lights of electrical devices mounted in the casing 20 may be seen. On the computer shown in Fig. 1 the dials 32 indicate elevation, the dials 33 range, the dials 34 the relative positions of the ship and target and the dials 35 the bearing. Jewel lenses 36 are mounted on the control panels to cover signal lights located within the casing 20. Indicators of other electrical instruments may be seen through the apertures 38, 39, 40, 41, 42, 43, 44, 45, 46, 47, 48, 49, 50, 51, 52, 53, 54, 55 and 56. The left side wall 22 of the casing 20 is apertured to accommodate parts of control members and apertures are provided at 57, 58, 59 and 60 in order that indicators of electrical instruments located within the casing in line with these apertures may be seen. The right side wall 23 is apertured to accommodate a control member and is apertured at 61 for observance of an indicator. Terminals 62, 63, 64 and 65 for conductor wires are mounted on the right side wall 23.

For manual control of some of the electrical devices supported in the casing 20 rotatable control members comprising knob devices are provided. Some of the knob devices are supported on the control panels 26, 27, 28 and 29 so that when it becomes necessary or advisable to remove the control panels from the casing 20 the control knobs will not have to be first removed but will simply come away with the control panels. The control knob devices are made in several different forms and each form will be subsequently described. Each control knob device however comprises a handhold member, normally free to rotate without affecting apparatus in the casing, and a plunger device nested within the handhold member and operable to make the handhold member of the knob device effective to turn a shaft located within the casing 20. Some of the knob devices are equipped with a crank and handle to facilitate turning the shaft and some are provided with brake means to prevent undue turning of parts. In some cases switch contacts are arranged for operation by means of the knob devices.

Five different types of control knob devices are employed in the computer shown in Figs. 1, 2 and 3 and the types are identified as A, B, C, D and E.

The type C control knob device 66 is shown in Figs. 4, 5 and 6 and the structure of this type of control knob device follows, in general, the pattern of the other control knob devices.

The control knob device 66 shown in Figs. 4, 5 and 6 comprises an apertured body 67 and a knob 68. The body 67 is mounted on an apertured panel 69 and is secured thereto by bolts 70 or other suitable fastening means. The panel 69 may be one of the control panels 26, 27, 28 and 29 and the bolts 70 may enter a ring 71. Secured within the body 67 and extending upwardly therefrom is a tubular bearing member 72 which is made threaded at the upper end 73 and provided with spaced outer bearing surfaces 74 and 75, an outer flange 76 and an inwardly extending end flange 77. The knob 68 is centrally apertured and comprises a handhold portion 78 and a neck portion 79. A sleeve bearing 80 is located within the neck portion 79 and frictionally engages the bearing surfaces 74 and 75 of the bearing member 72. The bearing 80 is secured against withdrawal from the knob 68 and may have end portions staked or spun over against portions of the knob 68 as indicated at 81. One end of the bearing 80 is in engagement with the flange 76 and the other end is in engagement with one of the locknuts 82 secured to the threaded end 73 of the tubular bearing member 72. A tubular shaft 83 extends through the tubular bearing member 72 and is enlarged at spaced points to provide bearing surfaces 84 and 85 in frictional engagement with the inner surface of the tubular bearing member 72. The shaft 83 has a reduced upper end portion 86 on which is mounted an apertured circular plate 87. The upper end of the shaft 83 is staked or spun over at 88 in a recess 89 formed in the upper surface of the plate 87 to hold the plate 87 securely fastened to the shaft 83. Spaced indentations 90 are provided in the upper surface of the plate 87, the indentations 90 being of generally hemispherical form and arranged in an annular row concentric with the shaft 83. The indentations 90 may terminate at their lower ends in apertures 91 formed in the plate 87. The handhold portion 78 of the knob 68 is recessed at 92 to accommodate the upper portions of the bearing 72 and the shaft 83, and to accommodate the locknut 82 and the plate 87. The upper end of the recess 92 opens into a recess 93 which extends to the top of the handhold portion 78 of the knob 68. The recess 93 is reduced in diameter at its lower end to provide a ledge 94 which is cut away at diametrically spaced points to provide keyways 95—95 to receive the ends 96 and 97 of a bar 98. The bar 98 is secured to the upper end of a plunger 99 which is movable lengthwise in the tubular shaft 83. The bar 98 is provided with embossings 100 to selectively enter the indentations 90 in the plate 87 when the plunger 99 is moved lengthwise in the shaft 83 to bring the bar 98 into engagement with the plate 87. The plunger 99 is equipped with an end bearing 101 comprising a stem 102 terminating at one end in an enlarged end portion 103 having a rounded bearing surface 104. The stem 102 is accommodated in a recess 105 formed in the plunger 99 in which it is retained by means of a bearing-button 106 supported on one end of a spring 107, the other end of the spring 107 being in engagement with a rod portion 108 of a clutch device 109. The rod portion 108 extends into the tubular shaft 83 and is secured in place by means of a pin 110 which extends transversely through the rod portion 108, the lower end of the tubular shaft 83 and a ring 111. The lower end of the rod portion 108 terminates in a plate portion 112 on the lower face of which is a diametrically extending bar portion 113 having bevelled edge portions 114. The bar portion 113 is dimensioned to fit into a corresponding recess 115 in a coupling device 116 which may be secured to a rotatable shaft 117 by means of a pin 118 or other suitable fastening means. The shaft 117 may be part of a potentiometer or other device to be operated by means of the control knob device 66. The structure of the coupling device 116 will be subsequently described since an understanding of the operation of the control knob device 66 may be had without consideration of the structure and arrangement of the coupling device 116.

When the control knob device 66 is supported on the panel 69 and the parts are in the positions shown in Fig. 4 the knob 68 may be rotated without causing rotation of the shaft 117. In this case the bearing 80 turns on the bearing surfaces 74 and 75, the bar 98 turns with the knob 68, the plunger 99 rotates with the bar 98 and the end bearing 101 rotates without transmitting any rotational movements to the rod portion 108 of the clutch device 109. To rotate the rod portion 108 of the clutch device 109 by means of the knob 68 the embossing 100 on the bar 98 must be brought into the indentations 90 in the plate 87 and the knob 68 must be turned while the embossings 100 are in the indentations 90. To bring the embossings 100 into the indentations 90 the plunger 99 may be pressed inwardly of the knob 68 by applying a suitable pressure to a disc 119 which is secured to the top of the bar 98 by rivets or other suitable fastening means 120.

When the plate portion 112 of the control knob device 66 is to turned by operation of the knob 68 the plunger 99 is pressed within the knob 68 and against the action of the spring 107 until the embossings 100 are within the recesses 90 as shown in Fig. 5. In this case when the knob 68 is turned and the bar 98 is rotated the plate 87 is rotated by means of the bar 98. Since the plate 87 is secured to the tubular shaft 83 the shaft 83 is rotated and causes rotation of the plate 112. Rotations of the plate 112 are transmitted to the coupling device 116 since the bar portion 113 is engaged in the recess 115 in the coupling device 116. Rotation of the coupling device 116 causes rotation of the shaft 117. The spring pressure developed in the spring 107 constantly endeavors to move the bar 98 out of engagement with the plate 87. Pressure must therefore be maintained on the disc 119 whenever the shaft 117 is being turned by means of the knob device 66. If the pressure on the disc 119 is relaxed the embossings 100 will come out of the indentations 90 and there will be no driving connection between the bar 98 and the plate 87 and hence no turning of the plate 112 and the shaft 117.

The natural way for an operator to operate the control knob device 66 to turn the shaft 117 is to press the plunger 99 inwardly of the knob 68 by thumb pressure applied to the disc 119 and maintaining the thumb pressure while the knob 68 is turned to cause turning of the shaft 117. Unless the shaft 117 is rather freely turnable it will be difficult to keep the plunger 99 pressed inwardly of the knob 68 since even a slight increase in load on the shaft 117 will be felt in the disc 119 and a relatively large increase in the load on the shaft 117 and continued efforts to turn the knob 68 will result in the embossings 100 riding out of the indentations 90 in the plate 87.

The coupling 116 serves as a mechanical connection between the control knob device 66 and the shaft 117. The coupling 116 is attached to the shaft 117 and the only connection between the coupling 116 and the control knob device 66 is by virtue of the engagement of the bar portion 113 on the plate 112 with the corresponding recess in the coupling 116. The control knob device 66 is mounted on the panel 69 and will come away with the panel 69 when the panel 69 is removed from the casing 20. The shaft 117 and the coupling 116 are located at some distance from the panel 69 and remain in the casing. The coupling 116 shown in Figs. 4 and 5 comprises a body 121 having an apertured base portion 122 and an end portion 123 in which the recess 115 is formed. The base portion 122 is apertured to accommodate the boss portion 124 of a flange 125. The flange 125 operates in a slot formed in the body 121 and may be moved lengthwise of the body 121 against the action of a spring 126, one end of which rests in a recess 127 formed in the flange 125, the other end of the spring 126 being in engagement with the inner face of the end portion 123 of the body 121. When the panel 69 with the knob device 66 supported thereon is mounted on the casing 20 the plate 112 engages the end portion 123 of the body 121 of the coupling 116. The body 121 is normally thrust by means of the spring 126 rather close to the normal position of the panel 69 and so that when the panel 69 is finally bolted in required position the body 121 of the coupling device 116 will be pressed lengthwise of the boss portion 124 of the flange 125 and against the action of the spring 126. The spring 126 serves to maintain the body 121 in engagement with the plate 112 and so that the bar portion 113 will rest in the recess 115. The coupling 116 will automatically adjust itself to slight differences in spacing of the shaft 117 from the normal position of the panel 69.

It will be seen, therefore, that a number of shafts 117 may be mounted in the casing 20 to the rear of the normal position of the panel 69, that knob devices of the general pattern of the knob device 66 may be mounted on the panel 69 to provide means for operating the shafts 117 and that when the shafts 117 are equipped with the couplings 116 the couplings 116 will automatically adjust themselves to compensate for slight differences in the spacing of the shafts 117 from the normal position of the panel 69. Under ordinary conditions the knob 68 may be freely turned without turning the shaft 117. The only way in which the shaft 117 may be turned by means of the knob 68 is by pressing the disc 119 inwardly of the knob 68 to bring the bar 98 into engagement with the plate 87 so that the embossings 100 engage in the indentations 90 and then holding the parts in this condition while the knob 68 is turned.

The embossings 100 are made well rounded, the indentations 90 are made relatively shallow and the spring 107 is constantly endeavoring to keep the bar 98 spaced from the plate 87. Any appreciable increase in load on the shaft 117 tending to retard or stop rotations of the shaft 117 will be reflected to the bar 98. The increase in load will be felt by the operator of the knob 68 and if the load is increased beyond a predetermined limit and turning of the knob 68 is continued the embossings 100 will act as cams to move the bar 98 to such position that the bar 98 is not in driving engagement with the plate 87. The torque applied to the shaft 83 is obtained by turning the knob 68 but the maintaining of the drive connection between the bar 98 and the plate 87 is dependent upon the pressure maintained on the disc 119.

The type A control knob device 128 is shown in Figs. 7, 8 and 9 and comprises a body 129, a knob 130, a crank 131, a shaft 132 and a disc 133. The body 129 is mounted on the panel 69 by bolts or other suitable fastening means 134 and supports a tubular bearing 135 which extends longitudinally within and beyond the body 129. The bearing 135 is flanged at 136, male threaded at 137 and provided with spaced outer bearing surfaces 138. The knob 130 is provided with a sleeve bearing 139 which is secured to the knob 130 and frictionally engages the bearing surfaces 138 and the flange 136. Locknuts 140 are mounted on the bearing 135 at 137 to retain the knob 130 on the bearing 135. Extending longitudinally within the bearing 135 is a bushing 141 having a flange 142 on one end and an inwardly thickened portion 143 on the other end and in which a non-circular aperture 144 is provided. The knob 130 is recessed at 145 to receive a plug 146 which extends over the flange 142 and is secured by suitable fastening means 147 to the knob 130. The plug 146 and the flange 142 are secured against relative rotation and screws 148 may be provided for this purpose. The crank 131 is mounted on a shaft 149 extending diametrically of the plug 146 and across a slot 150 formed in the plug 146. End bearings 151 are provided in the plug 146 to receive ends of the shaft 149. The crank 131 is constructed and arranged so that it may be used to facilitate turning the knob 130 and to longitudinally move the shaft 132 in one direction in the bushing 141. The shaft 132 has a non-circular enlarged portion 152 fitted into the aperture 144 in the bushing 141 and is operated in the manner of a plunger within the bushing 141. A spring 153 disposed within the bushing 141 and engaging the end portion 143 and a cap 154 on the shaft 132 serves to return the shaft 132 to normal position. The cap 154 extends above the flange 142 and is attached to the shaft 132 in any suitable manner. The lower end of the shaft 132 extends below the bushing 141 and carries a cup-shaped member 155 which has an apertured boss portion 156 extending upwardly from the inverted cup portion 157 and within the tubular bearing 135. The boss portion 156 is secured by means of a pin 158 to the shaft 132 and accommodates a stem portion 159 of the plate 133, the stem portion 159 being secured to the boss portion 156 by a pin 160 or other suitable fastening means. The plate 133 is apertured at spaced points to provide a circular row of apertures 161 which are enlarged at one end to provide generally hemispherical indentations 162. The plate 133 forms part of a clutch device 163 and the cup-shaped member 155 forms part of a brake device 164.

The clutch device 163 comprises the plate 133 and a coupling 165, one portion of which is attached to a rotatable shaft 166 and which is to be turned by means of the knob device 128. The coupling 165 comprises a body 167 having an apertured base portion 168 and an end plate 169. Embossings 170 are provided on the end plate 169 to engage in the indentations 162 in the plate 133. The base portion 168 is apertured to accommodate the boss portion 171 of a flange 172. A spring 173 is disposed between the inner face of the end plate 169 and the flange 172 to urge the body 167 and the end plate 169 in the direction of the plate 133, the extent of movement in this direction being limited by the flange 172 which is secured to the shaft 166.

When the shaft 166 is to be rotated by means of the knob device 128 the crank 131 is swung across the knob 130 from the position shown in Figs. 7 and 8 to the position shown in Fig. 9. In doing this the shaft 132 is pressed inwardly of the knob 130 by means of the crank 131 which has an enlarged portion 174 eccentric with the shaft 149 and operating as a cam to force the shaft 132 inwardly of the knob 130 and longitudinally of the bushing 141 against the action of the spring 153. Movement of the crank 131 to the position shown in Fig. 9 brings the plate 133 into engagement with the end plate 169 of the coupling 165. In this position the embossings 170 on the end plate 169 engage in the indentations 162 in the plate 133 and so that when the plate 133 is rotated the coupling 165 will be rotated to rotate the shaft 166. The pressure of the spring 173 is somewhat increased in bringing the plate 133 into engagement with the end portion 169 of the coupling 165 and this pressure is sufficient to keep the end portion 169 in engagement with the plate 133 while the plate 133 is being rotated unless the load on the shaft 166 is greater than a predetermined limit. If the load on the shaft 166 is greater than the predetermined limit or becomes such while the plate 133 is being rotated the embossings 17 will ride out of the indentations 162 so that the coupling 165 will not be rotated by the rotating movement of the plate 133. The enlarged portion 174 of the crank 131 is provided with a flat surface at 175 to engage the top of the cap 154 when the crank 131 is in the position shown in Fig. 9. The flat-to-flat engagement of these parts prevents the pressure of the spring 153 from moving the crank 131 from the position shown in Fig. 9.

When the crank 131 is in the position shown in Fig. 9 the crank 131 may be operated in the usual manner of a crank to rotate the knob 130, the cranking action applied to the crank 131 being transmitted to the knob 130 by way of the shaft 149 which extends crosswise of the crank 131 and diametrically of the plug 146. Rotations of the knob 130 are transmitted to the bushing 141 since the plug 146 is secured to the flange 142 of the bushing 141. The bushing 141 rotates within the bearing 135 and since the enlarged portion 152 on the shaft 132 is non-circular and fits the non-circular aperture 144 in the bushing 141 and does not come out of the bushing 141 the rotations of the bushing 141 are transmitted to the shaft 132. The cup-shaped member 155 is secured to the shaft 132 and the plate 133 is secured to the cup-shaped member 155. Rotations of the shaft 132 are therefore transmitted to the plate 133 by way of the cup-shaped member 155. The handle 176 of the crank 131 is normally left in the positions shown in Figs. 7 and 8 and so that the handle 176 extends into a notch 177 formed in the knob 130. The plug 146 is provided with a step 178 in the slot 150 to provide a rest for the arm 179 of the crank 131 when the crank 131 is in the position shown in Figs. 7 and 8. Diametrically across from the notch 177 a notch 180 is provided in the knob 130 to accommodate the arm 179 of the crank 131 when the crank 131 is in the position shown in Fig. 9. The slot 150 in the plug 146 is in alignment with slots 181 and 182 formed in the knob 130.

The brake device 164 comprises a support 183, a set of spaced posts 184 extending from the support 183 and a brake member 185. The brake member 185 is movably mounted on the posts 184 and is provided with apertures 186 at spaced points to accommodate the posts 184. The posts 184 are internally threaded to receive screws 187 which are adjustably mounted in the ends of the posts 184. Springs 188 and washers 189 are supported on the shanks of the screws 187 and the springs and washers are disposed between the heads 190 of the screws 187 and the brake member 185, the springs 188 serving to urge the brake member 185 toward the cup-shaped member 155. The rim of the cup-shaped member 155 is externally bevelled at 191 to meet and frictionally engage an internally bevelled boss 192 on the brake member 185. The support 183 may be mounted on bolts 193 extending from a wall 194 contained within or forming part of the casing 20. The brake member 185 may be adjusted relative to the cup-shaped member 155 by manipulation of the screws 187 and may be normally set to be just clear of engagement with the cup-shaped member 155 or may be set as shown in Fig. 8 to lightly engage the cup-shaped member 155 when the crank 131 is in the position shown in Fig. 8. When the crank 131 is moved to the position shown in Fig. 9 the cup-shaped member 155 is moved against the brake member 185 and to a sufficient extent to materially increase the pressure of the springs 188 to provide more braking action between the cup-shaped member 155 and the brake member 185. The braking action obtained should be sufficient to prevent undue turning of the shaft 166 by inertia of the parts forming a load on the shaft 166 or forming parts of the knob device 128. By suitable adjustment of the screws 187 to control the pressure of the springs 188 a predetermined pressure of the brake member 185 against the cup-shaped member 155 may be obtained.

In some cases the control knob apparatus is associated with an electric switch in order that the switch may be operated to a predetermined condition when the knob device 128 is conditioned to control the shaft 166. For this purpose a switch 195 is provided. The switch 195 may comprise a pile-up 196 of spring contacts with a pin 197 arranged in the path of movement of the brake member 185 and operable to move contacts in the pile-up 196 when the brake member 185 is moved. In Fig. 8 the pin 197 is pressed by the brake member 185 to make contact 198 engage contact 199. In Fig. 9 the knob device 128 has been conditioned to control the shaft 166, the brake member 185 has been moved by means of the cup-shaped member 155 away from the switch 195 and contact 198 has moved under its own spring tension away from contact 199 and into engagement with contact 200.

The type B control knob device 201 shown in Fig. 10 is constructed along the general lines of the type A control knob device 128 shown in Fig. 9. Any parts in the type B control knob device that are identical with parts in the type A control knob device are identified in Fig. 10 by the same numerals as are used to identify the parts in Fig. 9.

In the type B control knob device 201 a cup-shaped member 202 is supported on the shaft 132 in place of the cup-shaped member 155 employed in the type A. The cup-shaped member 202 carries a switch operating member 203 which is annular in form and has an annular wall portion 204 terminating in a shoulder 205. A switch device 206 comprising a pile-up 207 of spring contacts and an operating arm 208 is supported on a support 209 in position to be operated by means of the switch operating member 205. The operating arm 208 is mechanically connected to the contact spring 210 by means of a pin 211 and supports a wheel 212 which rides on the shoulder 205. When the arm 179 is swung across the knob 130 from the position shown in Fig. 10 to a diametrically opposite position and so that the flat surface 175 is in engagement with the cap 154 the shaft 132 is moved downward from the position shown in Fig. 10 to carry the cup-shaped member 202 and the switch operating member 203 downward. The downward movement of the switch operating member 203 is transmitted to the arm 208 through the shoulder 205 and the wheel 212. Downward movement of the arm 208 results in the movement of spring contact 210 from engagement with spring contact 213 and engagment of contact 210 with contact 214. When the knob 130 is rotated the switch operating member 203 rotates and the wheel 212 rides on the shoulder 205. In the type B knob device 201 the arm 179 carries a button 215 on one end in place of the handle 176 in the type A. The button 215 may be used in some measure to facilitate turning the knob 130 or may be employed as a signal to indicate the condition of the knob control device. In some cases the button 215 is colored red to serve as a danger signal when it is moved from the position shown in Fig. 10 diametrically across the knob device 130 and the knob device is in condition to turn the coupling 165 and the switch 206 is operated to close contact 210 against contact 214.

The type E control knob device 216 shown in Fig. 11 is like the type A control knob device 128 shown in Fig. 8 with the exception, however, that in the type E the brake device 164 of type A is not included and a modified cup-shaped member is employed. The cup-shaped member 217 is bevelled on the inner surface of the rim as shown at 218 to more readily guide the coupling device 165 into the space defined by the cup-shaped member 217 when the panel 69 with the knob device 216 is being applied to the casing 20.

The type D control knob device 219 shown in Fig. 12 follows in general the pattern of the type C control knob device 66 shown in Figs. 4, 5 and 6. The type D however is somewhat simpler in construction than the type C. Certain parts in the type D control knob device are duplicates of corresponding parts in the type C control knob device. Since the structures of these parts have already been described in the specification no further description of the parts is necessary to an understanding of the invention and the parts are simply identified in Fig. 12 with the same numerals as in Figs. 4, 5 and 6. Secured within the body 67 and extending upwardly therefrom is a tubular bearing member 220 which follows the structure of the bearing member 72 in the type C control knob device with the exception that in the bearing member 220 the lower end does not have the inwardly extending flange 77. Extending longitudinally within the bearing member 220 is a bushing 221 having a flange 222 on one end and an inwardly thickened portion 223 on the other end and in which a non-circular aperture 224 is provided. The flange 222 rests on top of the bearing 220 and the bushing 221 may be rotated within the bearing 220. A shaft 225 is supported in the bushing 221 and is provided with a non-circular enlarged portion 226 to fit the non-circular aperture 224 in the bushing 221. The shaft 225 is operable in the manner of a plunger in the bushing 221 against the action of a spring 227 and carries on its lower end an apertured plug 228 which is secured to the shaft 225 by a pin 229 or other suitable fastening means. Secured to the lower end of the plug 228 is a plate 230 operable to be brought into engagement with a coupling 165. The plate 230 is provided with indentations 231 for accommodation of embossings 170 on the coupling 165 in order that rotations of the plate 230 may be transmitted to the coupling 165 when the plate 230 is brought into engagement with the coupling 165. A cap 232 is secured by suitable fastening means 233 to the top of the shaft 225 and a bar 234 is secured to the cap 232 to extend diametrically across the recess 93 and into the keyways 95—95. A disc 119 is secured by rivets 120 or other suitable fastening means to the top of the bar 234.

When it is desired to rotate the coupling 165 by means of the type D control knob device 219 the operator may press the disc 119 inwardly of the knob 68 to force the shaft 225 longitudinally of the bushing 221 and against the action of the spring 227 and to bring the plate 230 into engagement with the coupling 165. While holding the parts in this position the operator may turn the knob 68 to cause the coupling 165 to turn. Release of the pressure on the disc 119 will result in the retraction of the plate 230 from the coupling 165 by the upward pressure of the spring 227.

Figs. 13, 14, 15 and 16 show a coupling 235 that may be used in place of the coupling 165 above described. Figs. 17 and 18 show a plate 236 that may be used in place of the plate 133 above described. The coupling 235 and the plate 236 shown in Figs. 13 to 18, inclusive, are drawn on enlarged scale relative to illustrations of the coupling and plate members in other figures of the drawings.

The coupling 235 comprises a body 237, an apertured end plate 238 and a T-shaped plunger 239. The body 237 has an apertured end portion 240 from which two walls 241 and 242 extend in spaced parallel relation to form in cooperation with the end portion 240 a recess 243 in which the cross-arm portion 244 of the T-shaped plunger 239 may be accommodated. The free end portions of the walls 241 and 242 are arranged to form a rest for the end plate 238 which serves as a closure for one end of the recess 243. The walls 241 and 242 may be drilled and tapped at 245 to receive mounting screws 246 or other suitable means for holding the end plate 238 in place. The outer face of the end plate 238 is provided with spaced embossings 247 and the end plate 238 may have a central aperture 248 provided therein and opening into a recess 249 formed in the inner face of the end plate 238. The T-shaped plunger 239 has a tubular body portion 250 extending through the apertured end portion 240 of the body 237 and suitable for mounting on a shaft not shown in these figures but which may be the shaft 166 shown in Figs. 8 and 9 or any other shaft on which the coupling 235 is to be mounted. The cross-arm portion 244 of the T-shaped plunger 239 is recessed at 251 to receive a washer 252 and one end of a spring 253, the other end of the spring 253 being disposed in the recess 249 in the inner face of the end plate 238. When the end plate 238 is applied to the body 237 and against the spring 253 the T-shaped plunger 239 as shown in Fig. 14 is urged longitudinally of the body 237 and so that the cross-arm portion 244 of the T-shaped plunger 239 is against the inner surface of the end portion 240 of the body 237. When the T-shaped plunger 239 is secured to a shaft which is not longitudinally movable and pressure is applied to the outer face of the end plate 238 the body 237 will be moved relative to the T-shaped plunger 239 and longitudinally thereof against the action of the spring 253.

The plate 236 shown in Figs. 17 and 18 comprises a plate portion 254 and a stem portion 255. The outer face 256 of the plate portion 254 is provided with a plurality of indentations 257. The indentations 257 are relatively closely spaced and arranged in a circle concentric with the stem portion 255. The indentations 257 are arranged so that any two diametrically disposed indentations 257 may receive the embossings 247 on the end plate 238 of the coupling 235. When the plate 236 is suitably connected to a rotatable member in a control knob device and the body portion 250 of the T-shaped plunger 239 in the coupling 235 is connected to a rotatable shaft the coupling 235 and the plate 236 may be used to provide a mechanical connection between the control knob device and the shaft. To drivingly connect the parts the plate 236 is brought into engagement with end plate 238 and so that the embossings 247 are engaged in the indentations 257.

It will be seen that the casing 20 is provided with removable control panels, control knob devices for operating electric control devices in the casing 20 are supported on the removable control panels and that when the removable control panels are removed from the casing 20 the control knob devices still remain on the removable control panels and come away with the panels. Also that the control knob devices provided on the removable control panels are constructed and arranged so that the knob members in the control knob devices may be freely turned without turning shafts in the casing 20 unless the control knob devices are intentionally operated to bring parts of the control knob devices into such condition that the shafts in the casing 20 will be operated when the knob members of the control knob devices are turned. The couplings employed in cooperation with the control knob devices are constructed so that when the removable control panel is being applied to the casing 20 one part of the coupling will move longitudinally relative to another part connected to a shaft in the casing 20 to compensate for inaccurate spacing of the shaft relative to the normal position of the removable control panel.

What is claimed is:

1. An electrical control device comprising a fixed body, a bearing supported in said body, a control knob rotatably supported on said bearing, a bushing rotatably supported in said bearing and secured to said control knob, a rotatable shaft extending through said bushing and in rotatable driving connection with said bushing, a return spring for said shaft, a driving connection between said shaft and said bushing, said shaft being operable longitudinally within said bushing and against the action of said spring and a crank supported in said control knob and operable to longitudinally move said shaft in said bushing.

2. A control knob device comprising a body, a tubular bearing supported in said body and extending beyond said body, a control knob rotatably supported on said bearing, a bushing extending into said bearing and rotatable relative to said bearing and secured to said control knob, a shaft extending longitudinally through said bushing, said shaft being longitudinally movable in said bushing and rotatable with said bushing, a spring to restore said shaft to normal position, a crank pivotally mounted on said control knob and operable to move said shaft longitudinally in one direction in said bushing, a plate and a cup-shaped member mechanically connected to said shaft and a clutch surface on said plate.

3. A control knob device comprising, in combination, a body, a tubular bearing supported in said body and extending beyond said body, a control knob rotatably supported on said bearing, a bushing extending into said bearing and rotatable in said bearing and secured to said control knob, a shaft extending through said bushing and movable longitudinally in said bushing and operable to be rotated by said bushing, a spring to restore said shaft to normal position, a crank pivotally mounted on said control knob and operable to move said shaft longitudinally and against the action of said spring, a plate and a cup-shaped member mechanically connected to said shaft, a clutch surface formed on said plate, a coupling operable to extend into said cup-shaped member, an end plate on said coupling operable to be engaged by said clutch surface, a brake member engageable with said cup-shaped member and a support for said brake member.

EDWARD D. MEAD.
ORWAR S. A. MESCH.

REFERENCES CITED

The following references are of record in the file of this patent:

UNITED STATES PATENTS

| Number | Name | Date |
| --- | --- | --- |
| 922,138 | Hendler | May 18, 1909 |
| 1,557,073 | McWhirter | Oct. 13, 1925 |
| 1,576,934 | Running | Mar. 16, 1926 |
| 1,774,843 | Petit | Sept. 2, 1930 |
| 1,878,602 | Ringbloom | Sept. 20, 1932 |
| 2,129,204 | Duperron | Sept. 6, 1938 |
| 2,243,755 | James | May 27, 1941 |
| 2,306,476 | Diener | Dec. 29, 1942 |
| 2,342,276 | Heheman | Feb. 22, 1944 |
| 2,344,441 | Lorenz | Mar. 14, 1944 |